United States Patent
Lu

Patent Number: 6,018,847
Date of Patent: Feb. 1, 2000

[54] HINGE AXLE DEVICE FOR A LCD MONITOR

[76] Inventor: Sheng-Nan Lu, No. 174, Chunying St., Shulin Chen, Taipei Hsien, Taiwan

[21] Appl. No.: 09/109,639

[22] Filed: Jul. 2, 1998

[51] Int. Cl.[7] .............................. E05C 17/64; E05F 1/08
[52] U.S. Cl. ................................ 16/337; 16/340; 16/374; 16/307
[58] Field of Search .............................. 16/337, 338, 340, 16/374, 389, 392, 307, DIG. 43; 361/681, 682; 403/119, 120, 146; 248/917–923

[56] References Cited

U.S. PATENT DOCUMENTS

| | | | |
|---|---|---|---|
| 4,781,422 | 11/1988 | Kimble | 16/337 |
| 4,953,259 | 9/1990 | Frye et al. | 16/337 |
| 5,109,570 | 5/1992 | Okada et al. | 16/337 |
| 5,335,142 | 8/1994 | Anderson | 361/681 |
| 5,473,794 | 12/1995 | Kobayashi | 16/337 |
| 5,812,368 | 9/1998 | Chen et al. | 361/681 |
| 5,894,633 | 4/1999 | Kaneko | 16/307 |
| 5,940,936 | 8/1999 | Lu | 16/337 |

FOREIGN PATENT DOCUMENTS

| | | | |
|---|---|---|---|
| 231429 | 5/1960 | Australia | 16/340 |
| 495324 | 8/1953 | Canada | 16/340 |

*Primary Examiner*—Chuck Y. Mah
*Attorney, Agent, or Firm*—Holland & Hart LLP

[57] ABSTRACT

A hinge axle device for a LCD monitor has two springs each respectively disposed on a sleeve covering a pivot and between a carrier and a seat to provide a suitable resistance force for turning the LCD monitor either upwards or downwards. It is, therefore, convenient for users to use the hinge axle device in a LCD monitor to acquire satisfied performance.

6 Claims, 4 Drawing Sheets

HINGE AXLE DEVICE FOR A LCD MONITOR

BACKGROUND OF THE INVENTION

1. Field of the Invention

The present invention relates to a hinge axle device for a LCD monitor, and more particularly to a hinge axle device which provides a capability of positioning the LCD monitor at any desired position.

2. Description of Related Art

A LCD monitor is generally used for a notebook computer because of its light weight and thin thickness. A hinge axle device mounted between a cover in which the LCD is mounted and a body of a computer provides the force to hold the cover at a proper angle.

Referring to FIG. 4, a conventional axle device comprises a pivot 90 having a stem 91 on an end thereof and a threaded portion 93 on another end thereof, and a bracket 95. The stem 91 is mounted within a cover (not shown) of a notebook computer. The threaded portion 93 is inserted through a hole 96 of the bracket 95, passed through a washer 80, a position washer 81, a plurality of dished washers 82 and secured by a nut 84. These dished washers 82 are tightened to provide a resistance by pressing them together.

Recently, with the size increasing and low electromagnetism radiation requirement of the LCD, users start to use a LCD monitor instead of a conventional CRT monitor. However, the weight of the LCD monitor is larger than the CRT monitor, so that the conventional axle device can not support the LCD monitor. Therefore, a force turning the LCD monitor upwards is less than a force turning the LCD monitor downwards. Thus, the conventional axle device having only a constant resistance force can not provide a suitable positioning.

Thus, a hinge axle device for a LCD monitor constructed in accordance with the present invention tends to mitigate and/or obviate the aforementioned problem.

SUMMARY OF THE INVENTION

The main object of the present invention is to provide a hinge axle device for a LCD monitor having springs each respectively mounted on a sleeve covering a pivot and between a carrier and a seat to provide a suitable resistance force for turning the LCD monitor either upwards or downwards.

Another object of the present invention is to provide a hinge axle device for a LCD monitor which can restore a lost resistance force and/or correct an improper resistance force by the springs.

Yet, another object of the present invention is to provide a hinge axle device for a LCD monitor, wherein the pivots each have a passage defined therein for receiving wire therein.

Other objects, advantages and novel features of the invention will become more apparent from the following detailed description when taken in conjunction with the accompanying drawings.

DETAILED DESCRIPTION OF THE PREFERRED EMBODIMENT

Figure 1:
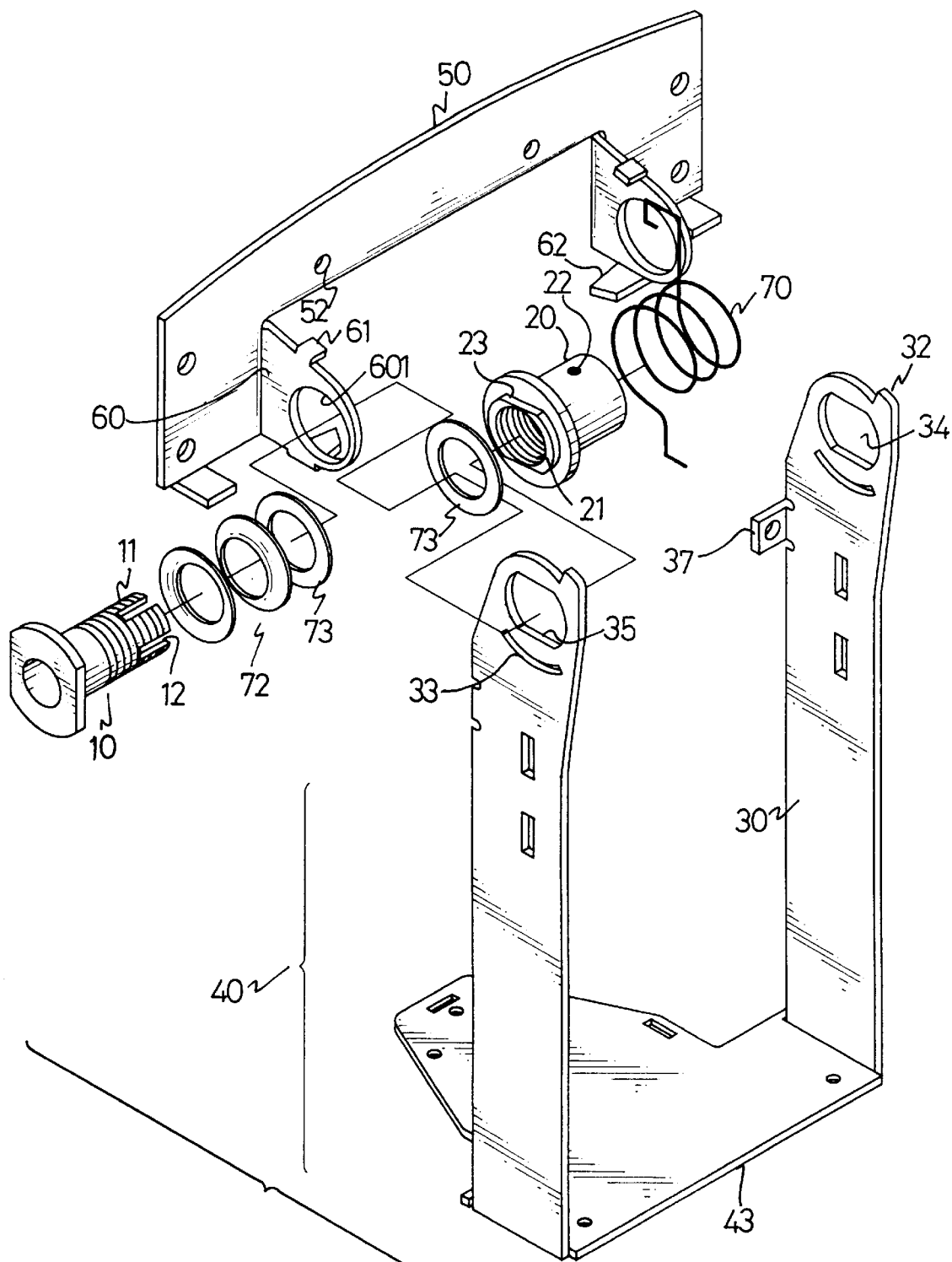
FIG. 1 is an exploded perspective view of the present invention.

Referring to FIG. 1, a hinge axle device of the present invention comprises a seat 40 formed with a horizontal plate 43 and two opposed upstanding plates 30. Each of the upstanding plates 30 defines a hole 34 and an arcuate slot 33 in an upper end and have a fastener 37, which defines a bore (not numbered) therein, perpendicular to the upstanding plate 30. A plane 35 is formed in each of the holes 34. A salient 32 is formed on an upper end of each of the upstanding plates 30.

A carrier 50 for mounting a LCD monitor (not shown) has two opposed protrusions 60 perpendicular to a body (not numbered) of the carrier 50. Each protrusion 60 defines an opening 601 therein and has a stop 61 formed on an upper end thereof and a tongue 62 formed on a lower end thereof. The carrier 50 also defines two apertures 52 respectively at left and right sides of the body.

Figure 2:
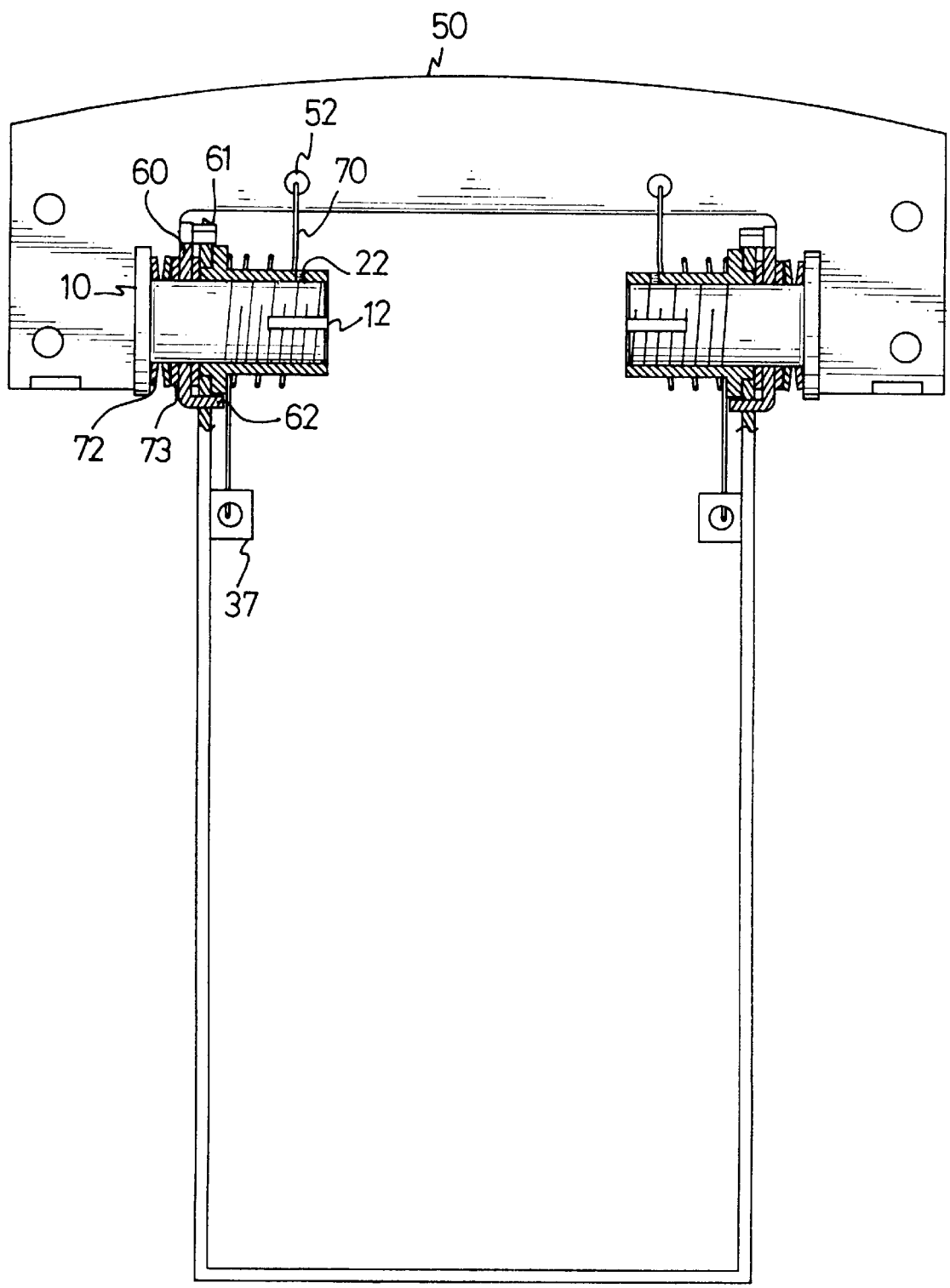
FIG. 2 is an elevation plan view of the present invention.
Figure 3:
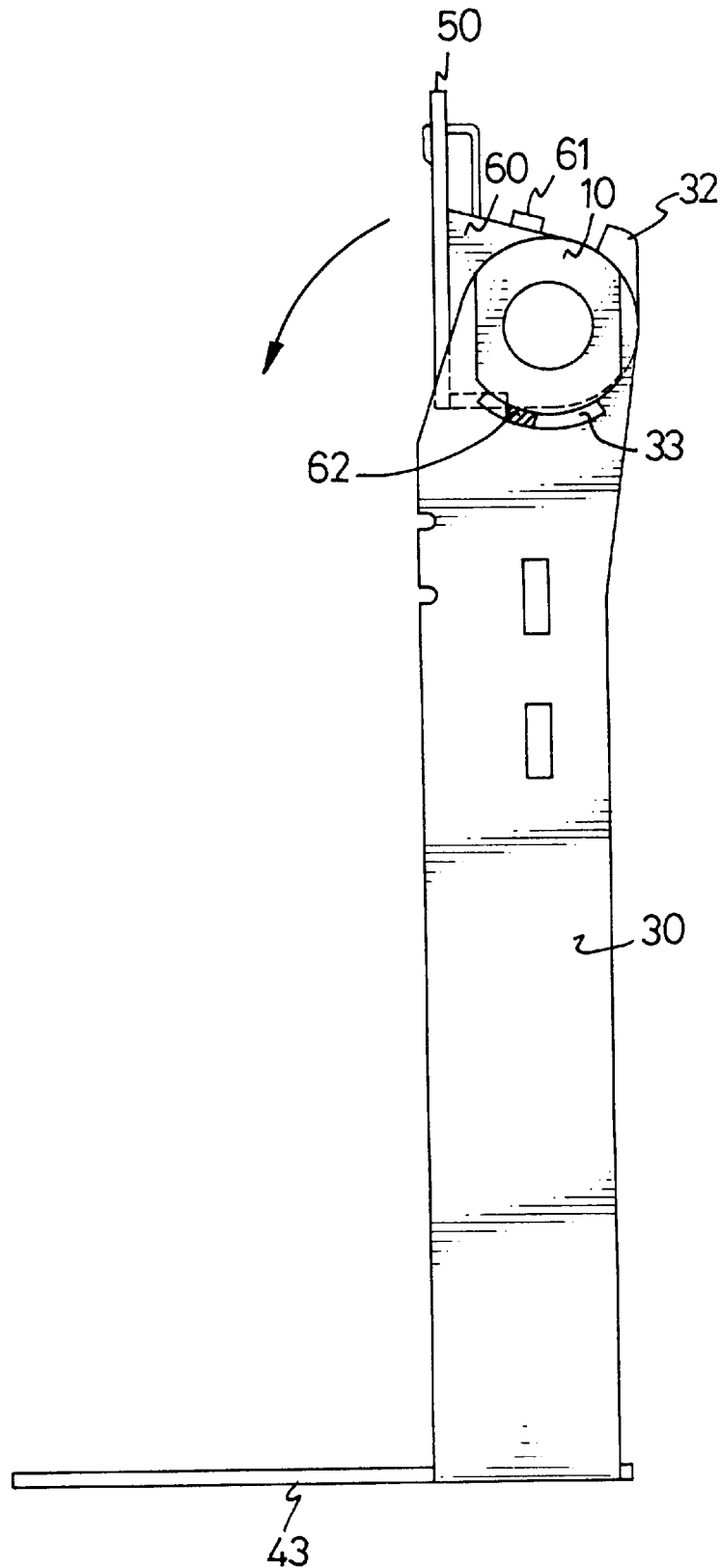
FIG. 3 is a side plan view of the present invention.
Figure 4:
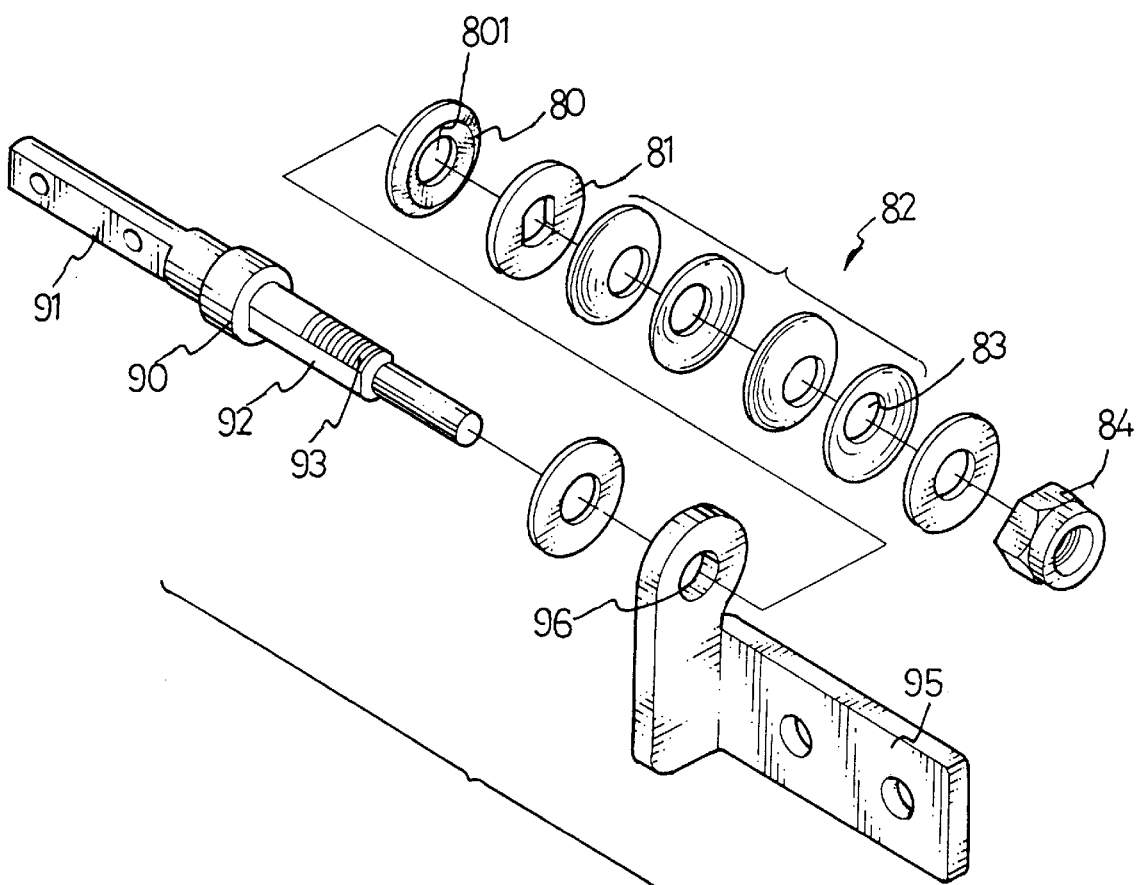
FIG. 4 is an exploded view of a conventional axle device for a LCD monitor of a notebook computer.

Referring to FIGS. 2 and 3, two pivots 10 each has a threads formed on an end thereof. Two sleeves 20 each also have a threads formed in a passage thereof. The carrier 50 can pivotally mounted on the seat 40 by the pivots 10 being respectively inserted into the openings 601 and the holes 34 with the sleeves 20. Each tongue 62 will be respectively mounted within each slot 33 of the seat 40. Each sleeve also has a threads aperture 22 through its side wall. A screw (not shown) will turned into the threads aperture 22 and cooperated with one of a plurality of notches defined on the pivot 10 to lock the pivot 10 and the sleeve 20.

A plurality of dished washers 72 and a washer 73 are disposed between the pivot 10 and the protrusion 60 of the carrier 50 and another washer 73 is disposed between the protrusion 60 and the upstanding plate 30. The dished washers 72 which will be pressed in assembling, have a damping function for a rotation of the carrier 50 about the seat 40. Thereby, the carrier 50 will be positioned at any demanded places. Furthermore, there is two springs 70 each being disposed on the sleeve 30, of which an end is fastened in the bore of the fastener 37 and another end is fastened in the aperture 52. When the carrier 50 is turned downwards in a direction as shown in FIG. 3, the springs 70 will increase the amortization between the carrier 50 and the seat 40 to provide a preferred positioning to the carrier 50.

The carrier 50 is only turned with a certain angle because the tongues 62 in the slots 33 can moved within a limited region, while the stops 61 will be resisted by the salient 32 to prevent the carrier 50 being excessively turned up.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A hinge axle device for a LCD monitor comprising:

a seat having:
   a horizontal plate;
   two opposed upstanding plates each defining a hole in an upper end thereof; and
   two fasteners respectively formed on one of the upstanding plates at least defining a bore therein;

a carrier having:
- a body at least defining two apertures respectively at left and right sides thereof; and
- two protrusions perpendicular to the body each defining an opening therein;

two pivots for pivotally connecting the carrier and the seat being respectively threadingly mounted into a sleeve by passing through the opening of the protrusion and the hole of the upstanding plate;

a plurality of dished washers disposed between one end of the pivot and the protrusion;

two washers respectively disposed between the dished washers and the protrusion and between the protrusion and the upstanding plate; and two springs, each of which one end thereof is secured in the respective aperture of the carrier and another end is secured in the bore of the respective fastener.

2. The axle device for a LCD monitor as claimed in claim 1, wherein the standing plates each have a arcuate slot defined beneath the hole and the protrusions each have a tongue formed thereon for received in the slot.

3. The axle device for a LCD monitor as claimed in claim 1, wherein the pivots each have a passage define therein.

4. The axle device for a LCD monitor as claimed in claim 1, wherein the holes of the upstanding plates each forms two opposed planes therein, the sleeves each also forms two opposed planes thereon, then by abutting the opposed planes of the upstanding plates with the opposed planes of the sleeves, the sleeves mounted with the pivots being fixedly disposed in the holes to prevent a relative rotation therebetween.

5. The axle device for a LCD monitor as claimed in claim 1, wherein each pivot has a plurality of notches formed on a distal end, and each sleeve defines a threads aperture thereon for locking the pivot by a screw.

6. The axle device for a LCD monitor as claimed in claim 1, wherein the upstanding plates each forms a salient and the protrusions each forms a stop to prevent the carrier being excessively turned up.

* * * * *